(12) United States Patent
Frey et al.

(10) Patent No.: US 11,441,436 B2
(45) Date of Patent: Sep. 13, 2022

(54) FLOW PATH ASSEMBLIES FOR GAS TURBINE ENGINES AND ASSEMBLY METHODS THEREFORE

(71) Applicant: General Electric Company, Schenectady, NY (US)

(72) Inventors: David Alan Frey, West Chester, OH (US); Kirk Douglas Gallier, Liberty Township, OH (US); Daniel Patrick Kerns, Mason, OH (US); Brandon ALlanson Reynolds, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 16/994,751

(22) Filed: Aug. 17, 2020

(65) Prior Publication Data
US 2020/0378268 A1 Dec. 3, 2020

Related U.S. Application Data

(63) Continuation of application No. 15/690,346, filed on Aug. 30, 2017, now Pat. No. 10,746,035.

(51) Int. Cl.
*F01D 9/04* (2006.01)
*F01D 11/00* (2006.01)
(Continued)

(52) U.S. Cl.
CPC ............ *F01D 9/044* (2013.01); *C04B 35/515* (2013.01); *C04B 35/571* (2013.01);
(Continued)

(58) Field of Classification Search
CPC ........ F01D 9/042; F01D 9/044; F01D 11/003; F01D 11/005
See application file for complete search history.

(56) References Cited

U.S. PATENT DOCUMENTS

| 4,219,980 A | 9/1980 | Loyd |
| 4,395,195 A | 7/1983 | DeCosmo et al. |
(Continued)

FOREIGN PATENT DOCUMENTS

| CN | 204344175 U | 5/2015 |
| CN | 106103898 A | 11/2016 |
(Continued)

OTHER PUBLICATIONS

European Search Report Corresponding to EP181892159 dated Dec. 10, 2018.
(Continued)

*Primary Examiner* — J. Todd Newton
*Assistant Examiner* — Brian O Peters
(74) *Attorney, Agent, or Firm* — Dority & Manning, P.A.

(57) ABSTRACT

Flow path assemblies and methods for forming such flow path assemblies for gas turbine engines are provided. For example, a flow path assembly for a gas turbine engine has a boundary structure, an airfoil, and a locking feature. The boundary structure and the airfoil are formed from a composite material. The boundary structure defines an opening and a cutout proximate the opening, and the airfoil is sized to fit within the opening of the boundary structure. The locking feature is received within the cutout defined by the boundary structure to interlock the airfoil with the boundary structure.

12 Claims, 10 Drawing Sheets

(51) Int. Cl.
  *F01D 25/00* (2006.01)
  *F01D 25/24* (2006.01)
  *C04B 35/573* (2006.01)
  *C04B 37/00* (2006.01)
  *C04B 35/571* (2006.01)
  *C04B 35/515* (2006.01)
  *C04B 35/80* (2006.01)

(52) U.S. Cl.
  CPC ............ *C04B 35/573* (2013.01); *C04B 35/80* (2013.01); *C04B 37/001* (2013.01); *F01D 9/041* (2013.01); *F01D 11/003* (2013.01); *F01D 11/005* (2013.01); *F01D 25/005* (2013.01); *F01D 25/24* (2013.01); *C04B 2235/48* (2013.01); *C04B 2237/38* (2013.01); *C04B 2237/61* (2013.01); *C04B 2237/84* (2013.01); *F05D 2220/32* (2013.01); *F05D 2230/10* (2013.01); *F05D 2230/23* (2013.01); *F05D 2230/31* (2013.01); *F05D 2230/60* (2013.01); *F05D 2250/75* (2013.01); *F05D 2260/30* (2013.01); *F05D 2260/36* (2013.01); *F05D 2300/603* (2013.01); *F05D 2300/6033* (2013.01)

(56) References Cited

U.S. PATENT DOCUMENTS

| | | | |
|---|---|---|---|
| 4,990,056 A | 2/1991 | McClain et al. | |
| 5,074,749 A | 12/1991 | Fouillot et al. | |
| 5,348,602 A | 9/1994 | Makarenko et al. | |
| 6,200,092 B1 | 3/2001 | Koschier | |
| 6,524,065 B2 | 2/2003 | Briesenick et al. | |
| 6,648,597 B1 | 11/2003 | Widrig et al. | |
| 6,830,437 B2 | 12/2004 | Cairo et al. | |
| 7,237,388 B2 | 7/2007 | Aumont et al. | |
| 7,249,462 B2 | 7/2007 | Aumont et al. | |
| 7,546,743 B2 | 6/2009 | Bulman et al. | |
| 7,799,405 B1 | 9/2010 | Vance et al. | |
| 8,714,485 B2 | 5/2014 | Matheson et al. | |
| 8,905,711 B2 | 12/2014 | Suciu et al. | |
| 8,926,262 B2 | 1/2015 | Tanahashi et al. | |
| 9,068,464 B2 | 6/2015 | Morrison et al. | |
| 9,079,386 B2 | 7/2015 | Meyer et al. | |
| 9,297,266 B2 | 3/2016 | Adair et al. | |
| 9,308,708 B2 | 4/2016 | Kleinow | |
| 9,335,051 B2 | 5/2016 | Jarmon et al. | |
| 9,726,028 B2 | 8/2017 | Marra et al. | |
| 9,803,486 B2 | 10/2017 | Freeman et al. | |
| 10,370,986 B2 | 8/2019 | Heitman et al. | |
| 10,465,533 B2 | 11/2019 | Morgan et al. | |
| 2005/0254942 A1 | 11/2005 | Morrison et al. | |
| 2010/0139847 A1 | 6/2010 | Law et al. | |
| 2014/0193270 A1 | 7/2014 | Plunkett et al. | |
| 2015/0003989 A1 | 1/2015 | Uskert et al. | |
| 2015/0016972 A1 | 1/2015 | Freeman et al. | |
| 2015/0050158 A1 | 2/2015 | Thomas et al. | |
| 2015/0308277 A1 | 10/2015 | Verheist | |
| 2015/0377061 A1 | 12/2015 | Boeck | |
| 2016/0032778 A1 | 2/2016 | Sanchez | |
| 2016/0146028 A1 | 5/2016 | Lazur | |
| 2016/0376899 A1 | 12/2016 | Prugarewicz et al. | |

FOREIGN PATENT DOCUMENTS

| | | |
|---|---|---|
| DE | 102004005237 B4 | 3/2007 |
| JP | H0333403 A | 2/1991 |
| JP | 2007/132353 A | 5/2007 |
| JP | 2010/229837 A | 10/2010 |
| JP | 2016/511733 A | 4/2016 |
| WO | WO2014/137457 A1 | 9/2014 |
| WO | WO2014/158284 A2 | 10/2014 |

OTHER PUBLICATIONS

European Search Report Corresponding to EP181892159 dated Apr. 17, 2019.
Translated Japanese Office Action Corresponding to JP2018156832 dated Oct. 28, 2019.
Machine Translated Japanese Office Action Corresponding to Application No. 2018156832 dated Mar. 26, 2020.
Machine Translated Chinese Search Report Corresponding to Application No. 201810993080 dated Oct. 21, 2020.

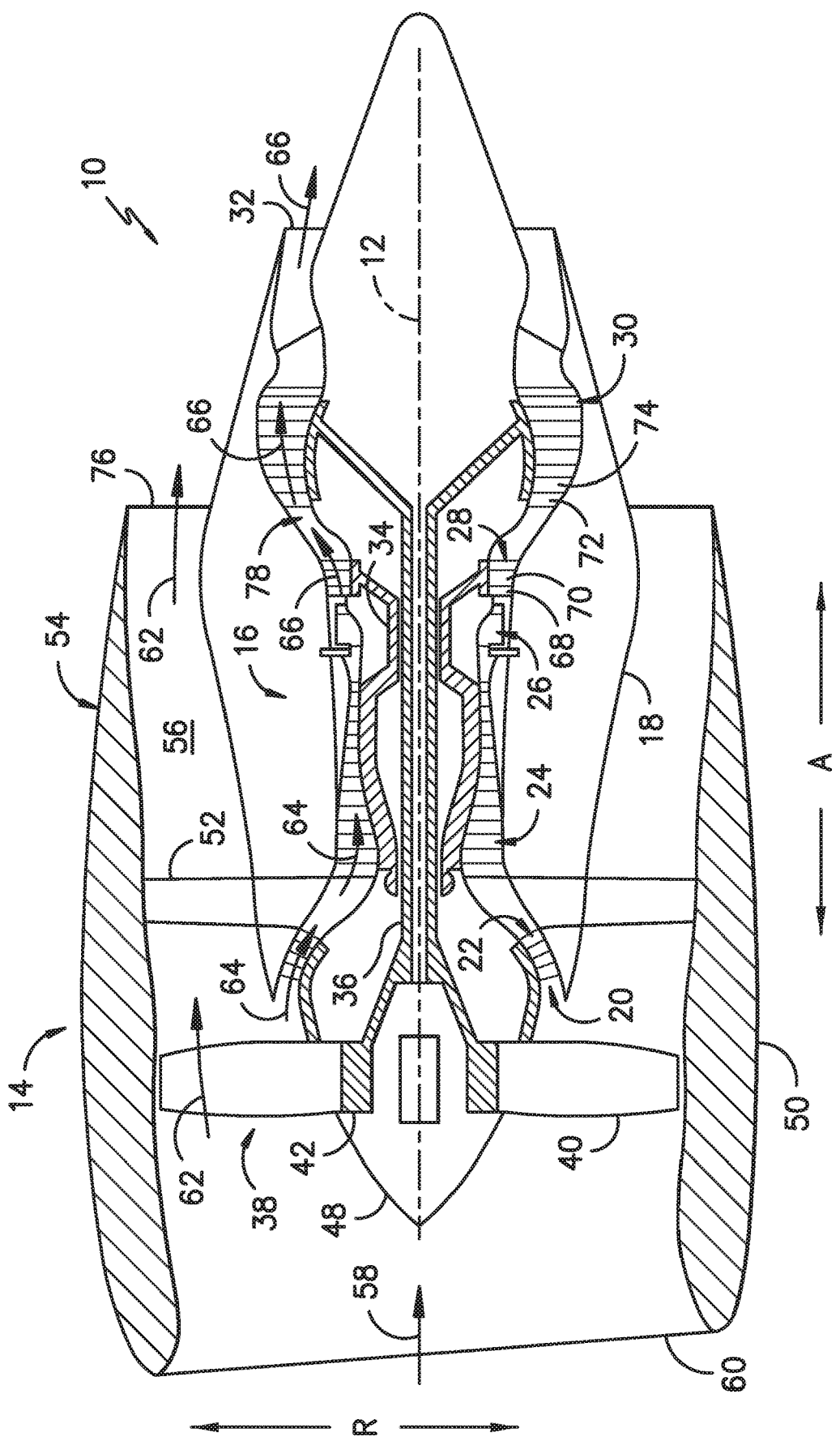
FIG. -1-

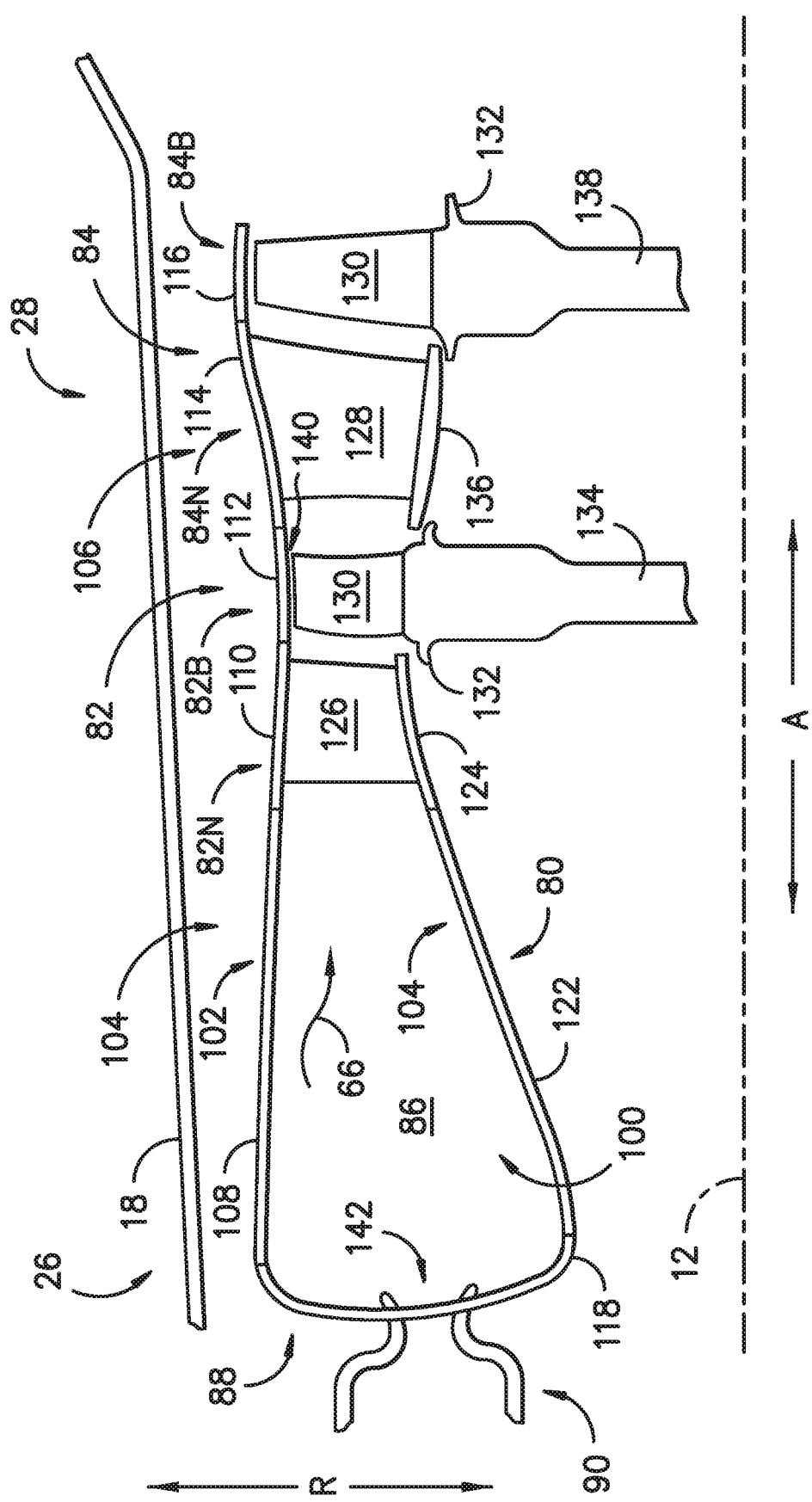
FIG. -2-

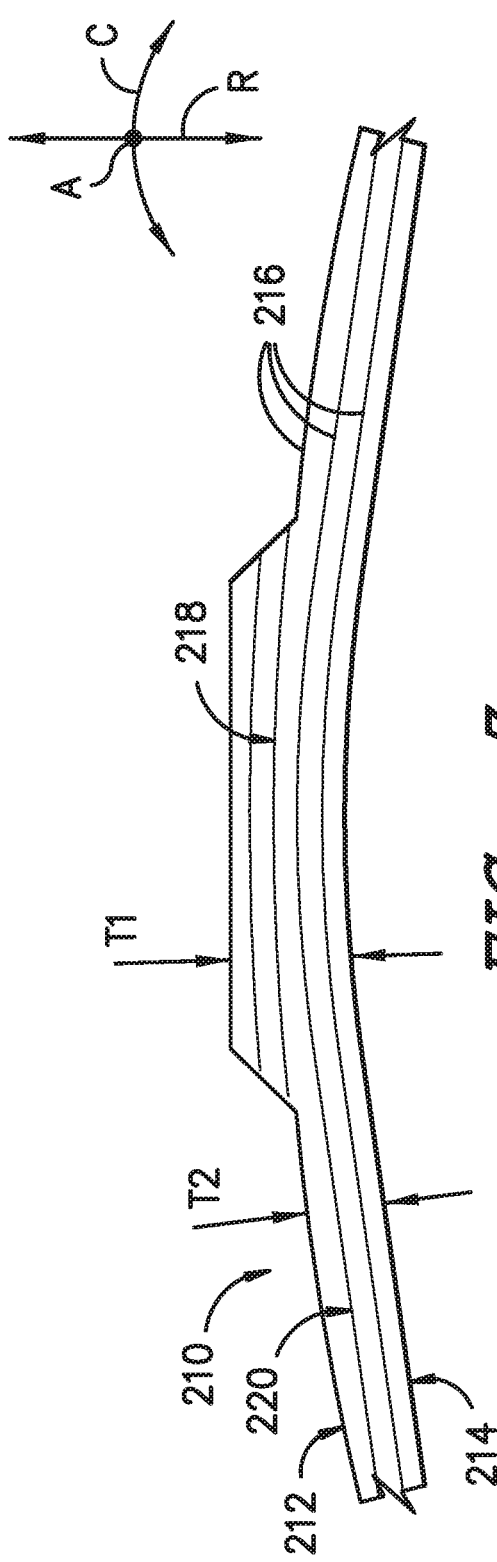
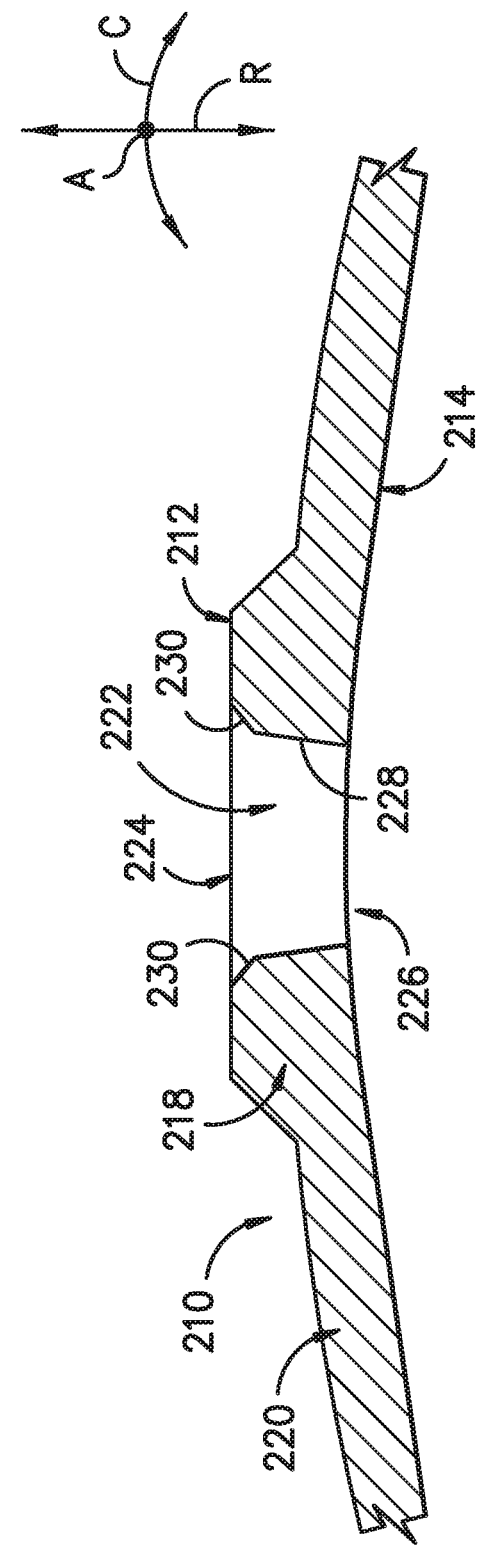

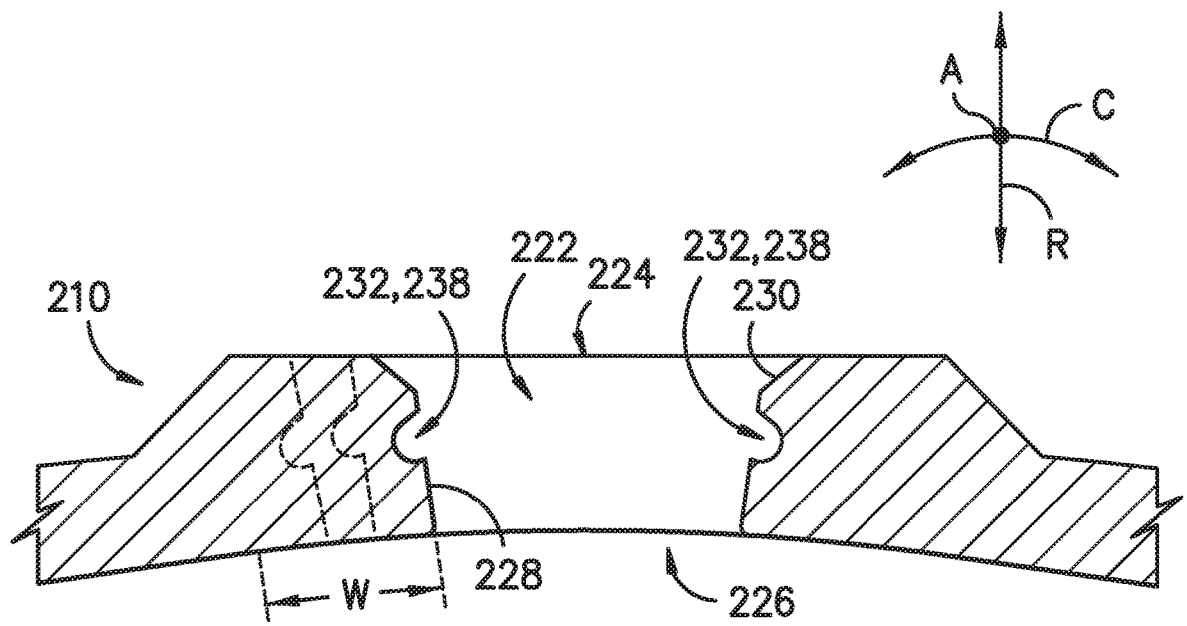
FIG. -5-
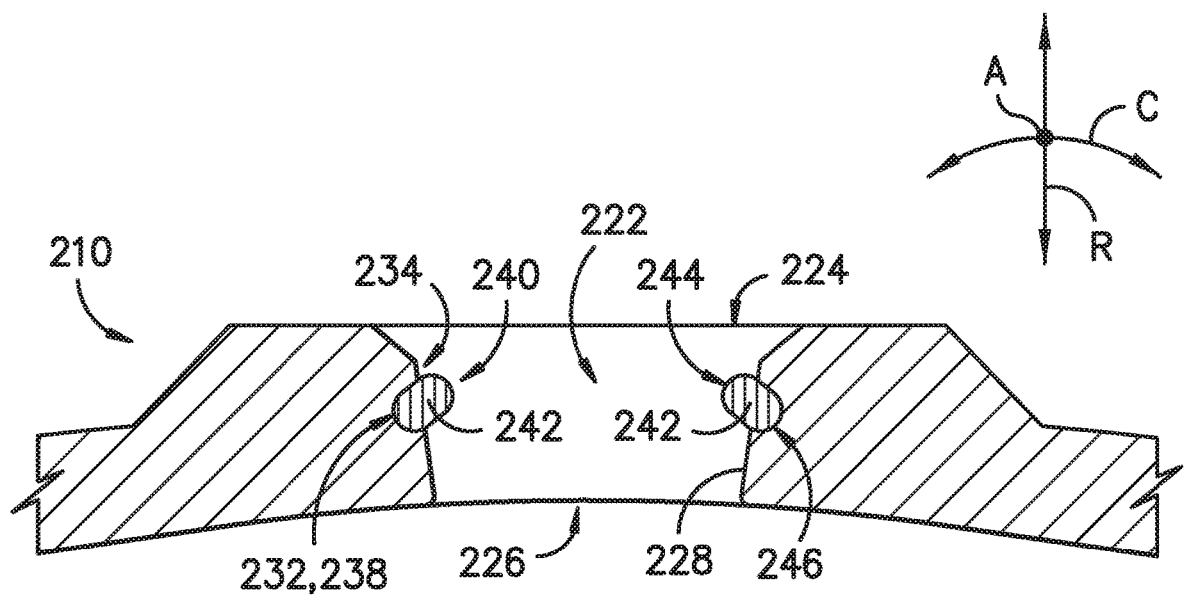
FIG. -6-

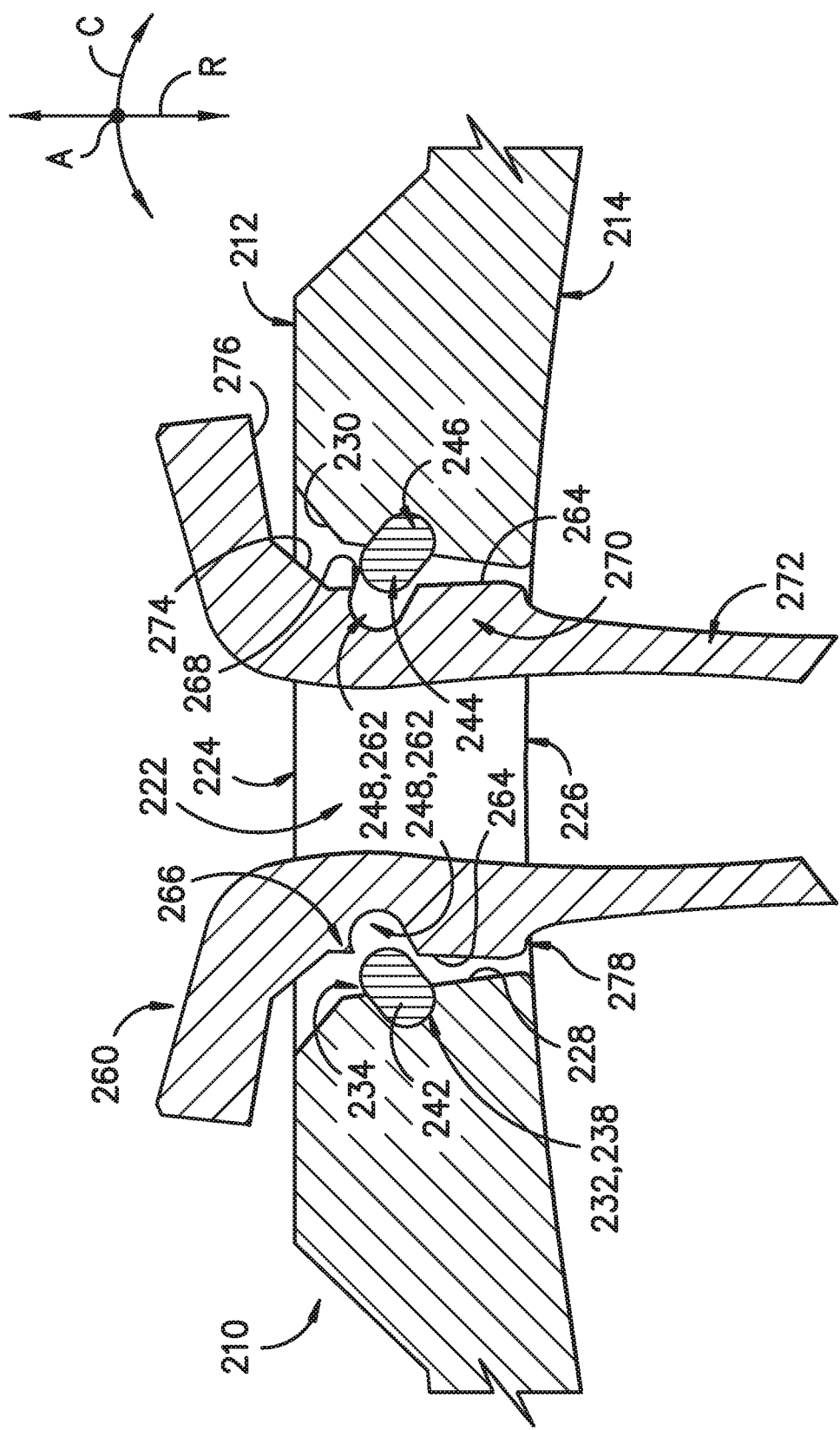
FIG. -7-

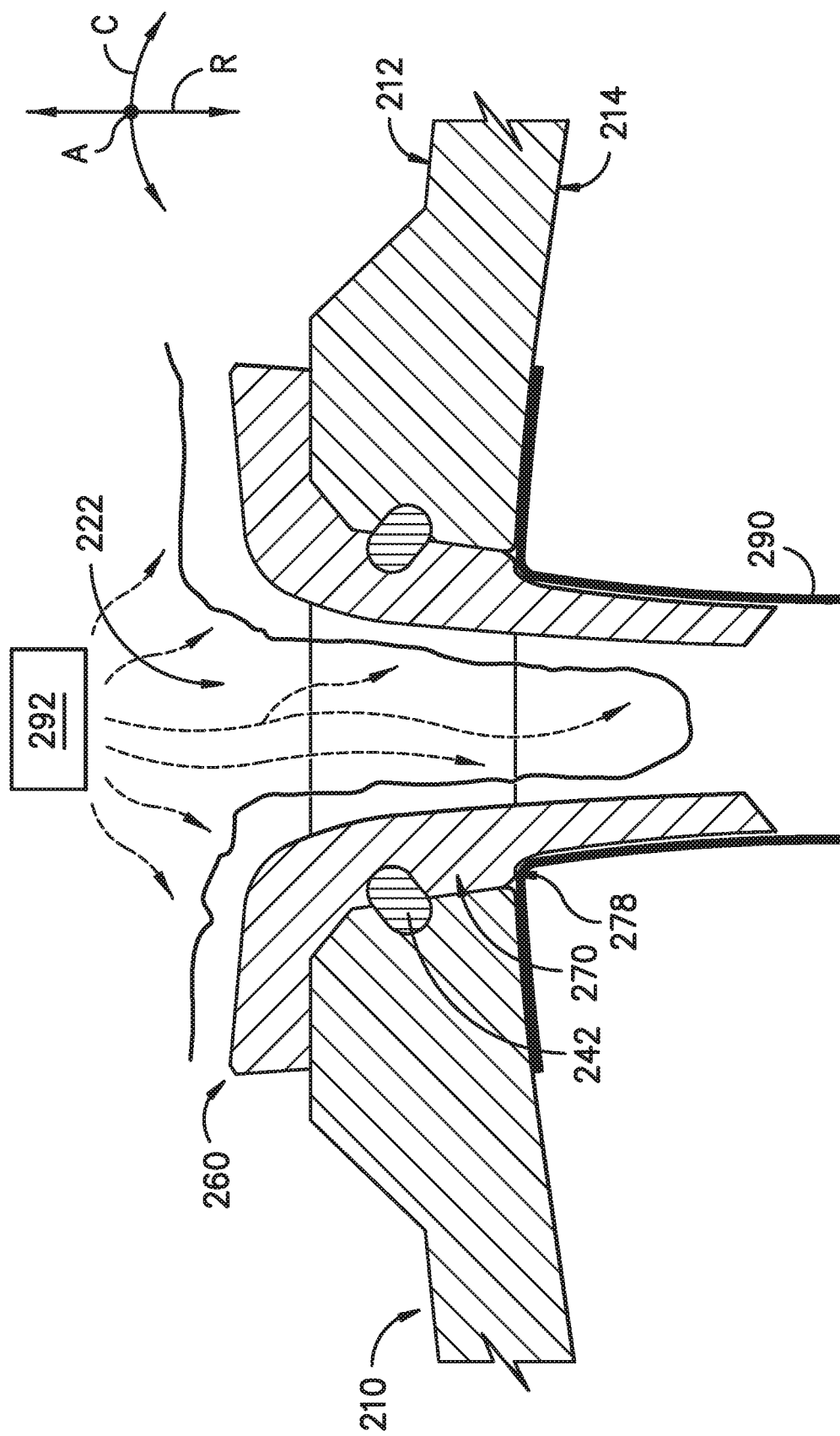
FIG. -8-

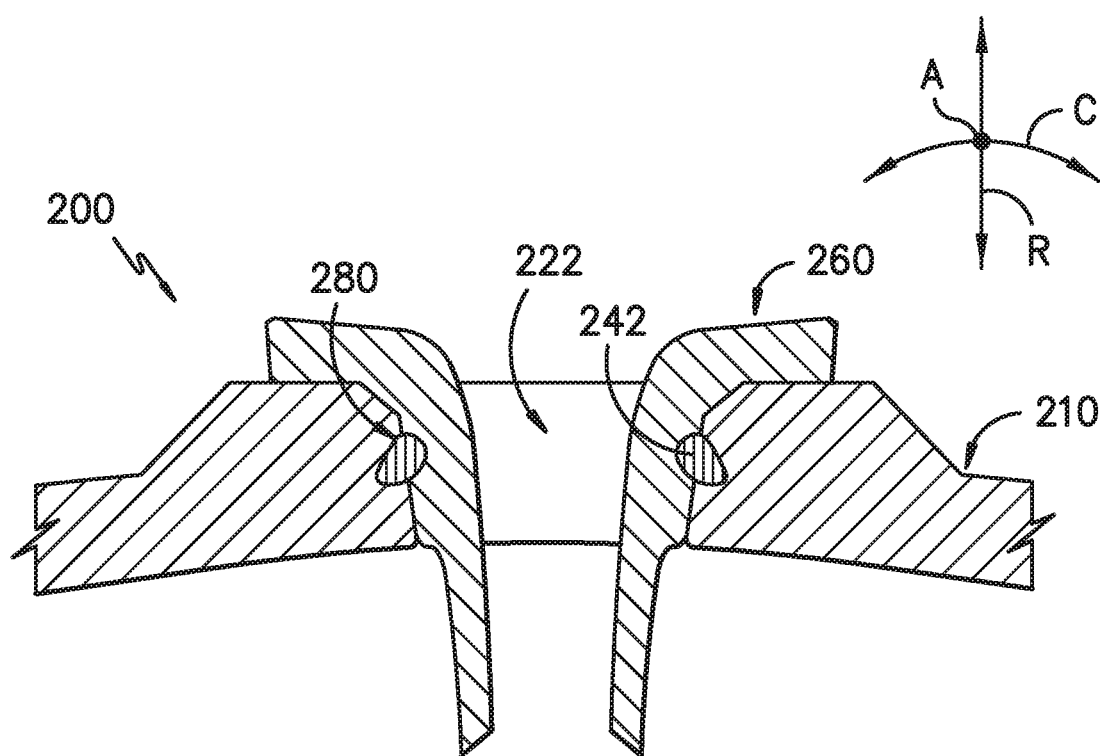
FIG. -9-
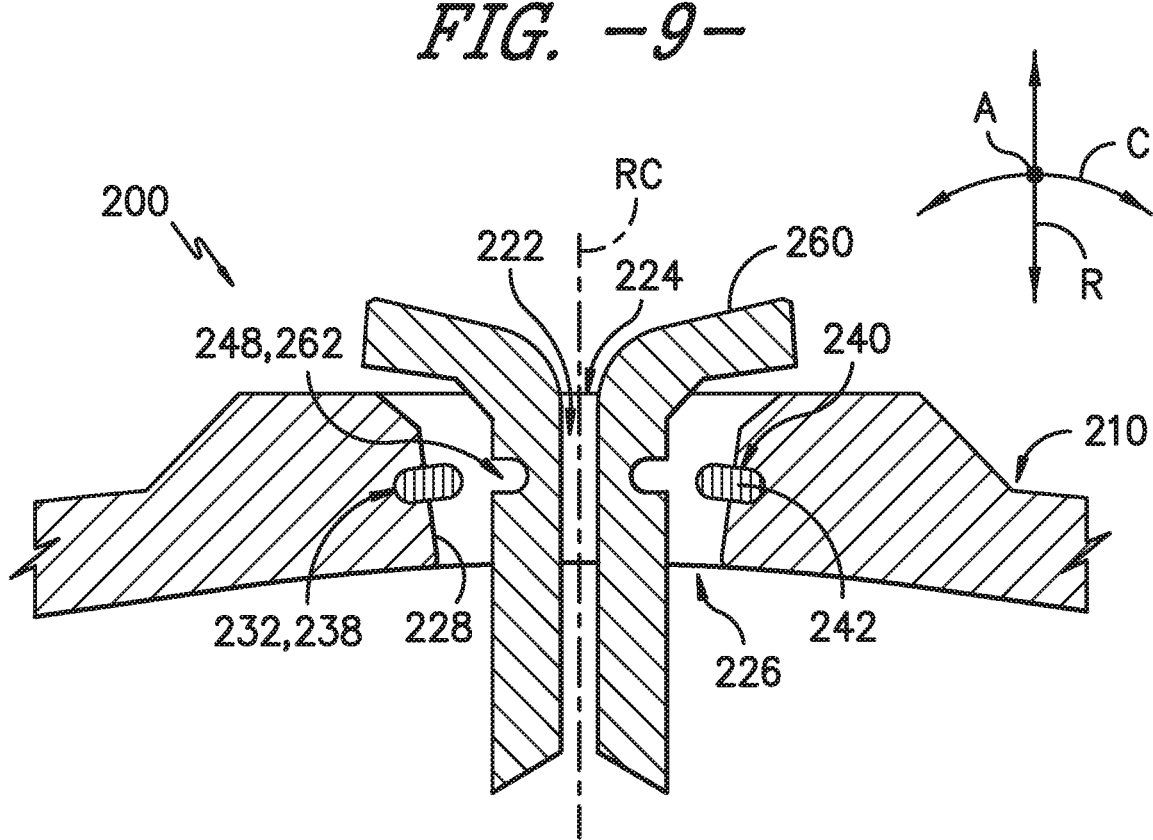
FIG. -10-

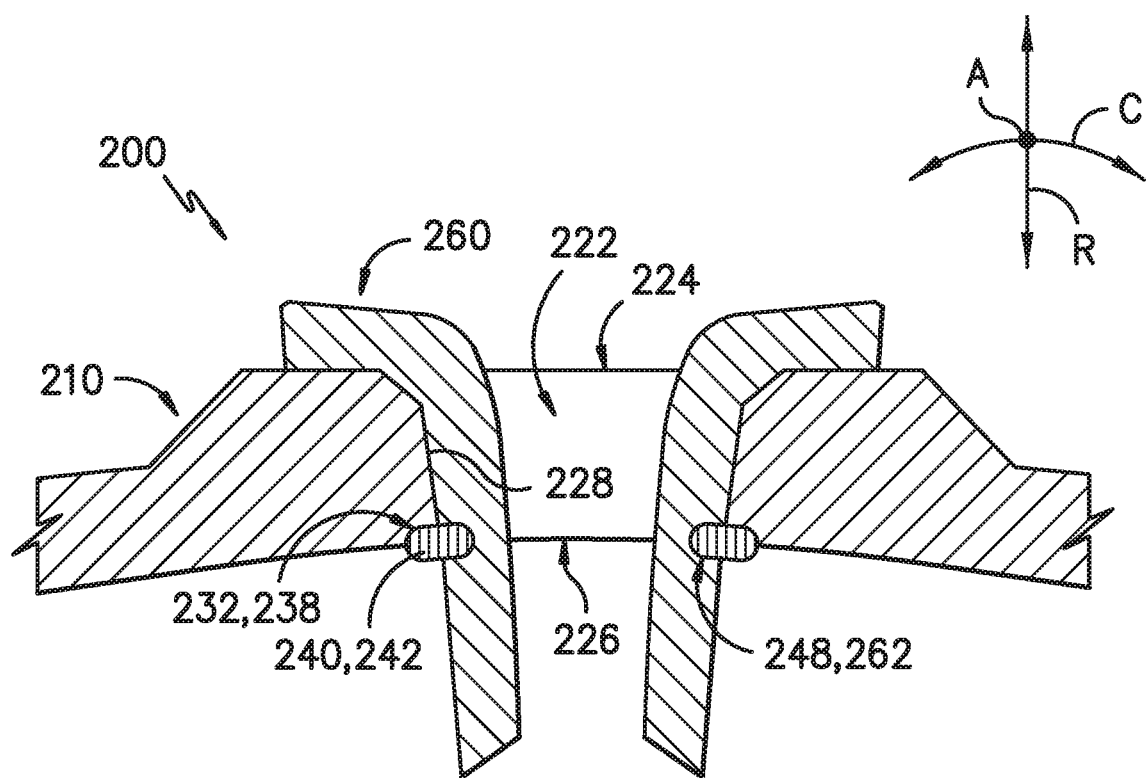
FIG. -11-
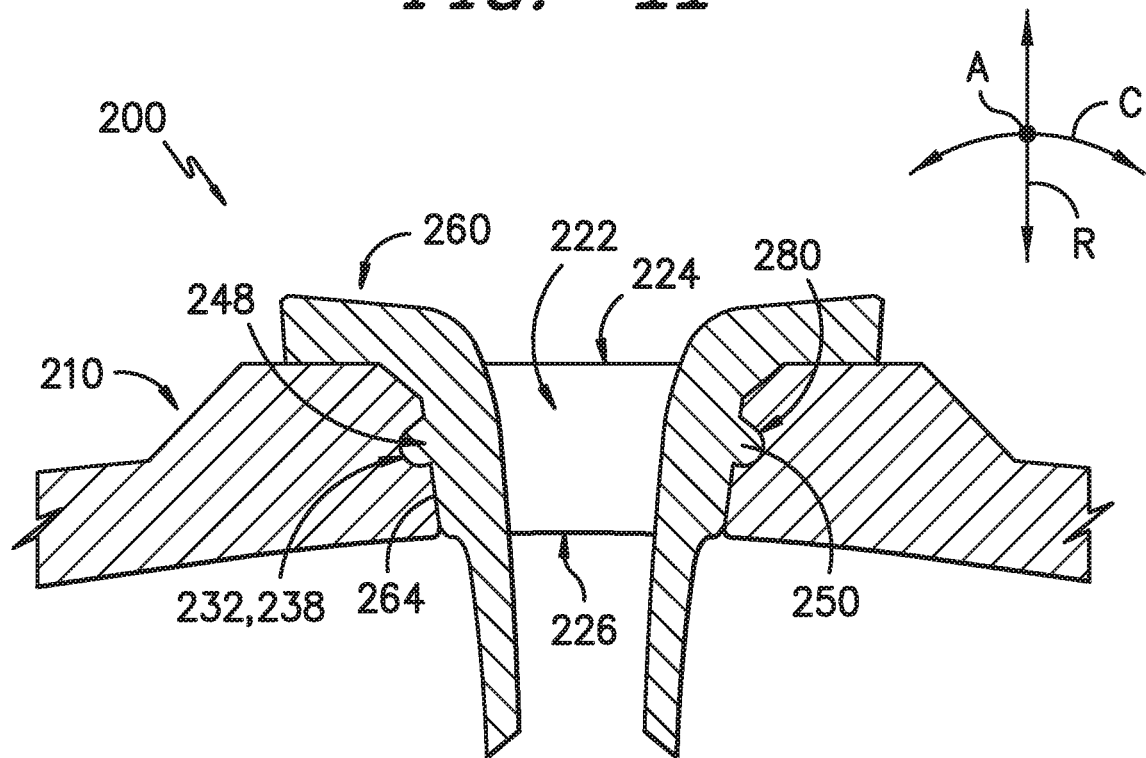
FIG. -12-

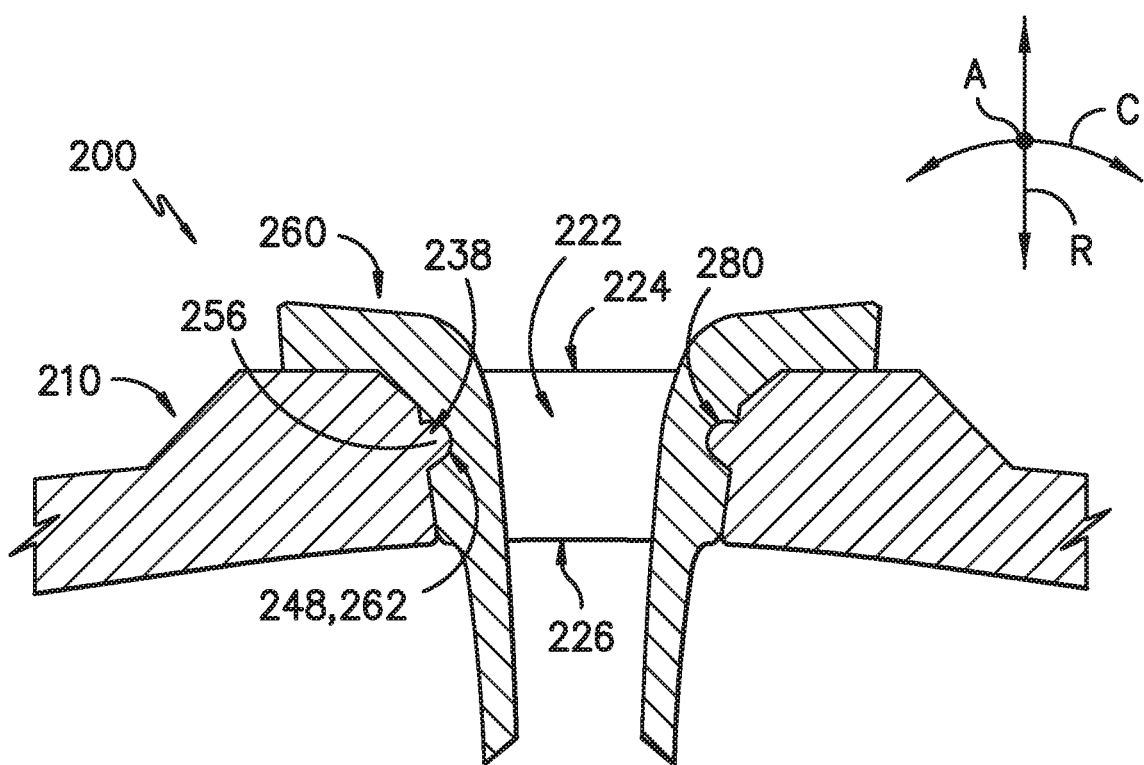
FIG. -13-
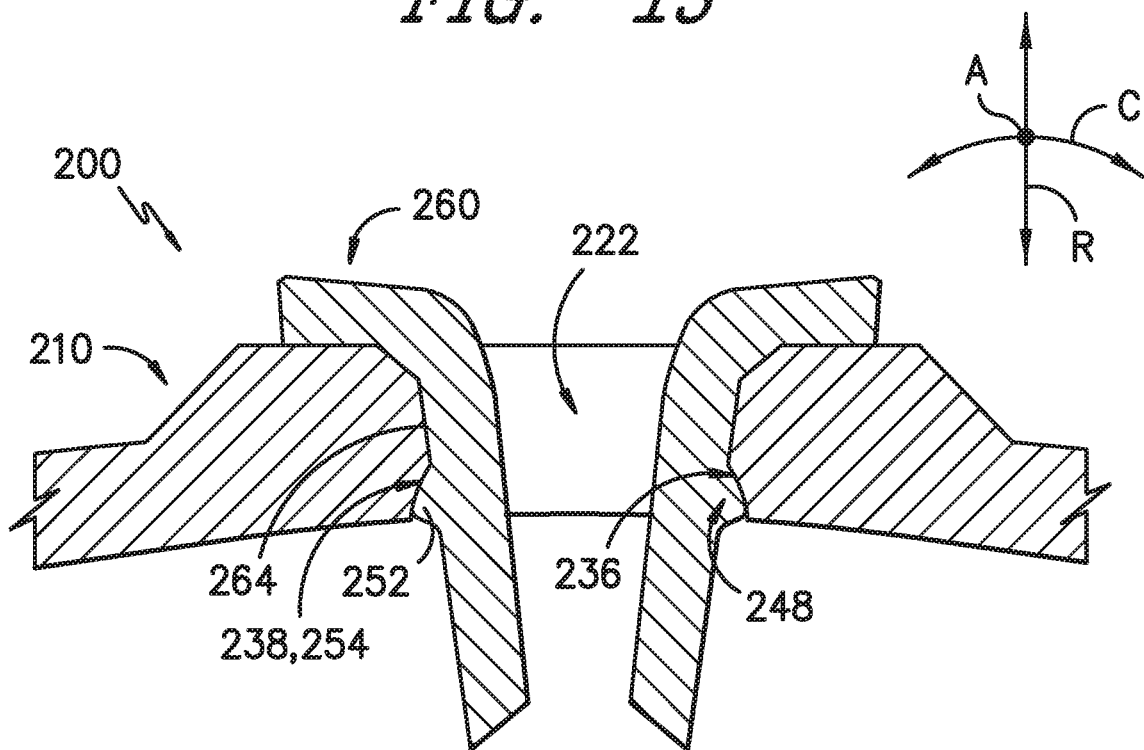
FIG. -14-

300

302

INSERTING THE AIRFOIL DEFINING A CUTOUT INTO AN OPENING DEFINED BY THE BOUNDARY STRUCTURE, THE BOUNDARY STRUCTURE DEFINING A CUTOUT, WHEREIN WHEN THE AIRFOIL IS INSERTED INTO THE OPENING, A LOCKING RING IS RECEIVED WITHIN THE CUTOUT DEFINED BY THE BOUNDARY STRUCTURE AND THE CUTOUT DEFINED BY THE AIRFOIL

304

PRESSING THE AIRFOIL AGAINST THE BOUNDARY STRUCTURE SUCH THAT THE LOCKING RING FORMS A SEAL BETWEEN THE AIRFOIL AND THE BOUNDARY STRUCTURE

PRESSING THE SECOND COMPONENT AGAINST THE FIRST COMPONENT WHILE AT LEAST ONE OF THE FIRST COMPONENT AND THE SECOND COMPONENT ARE IN A GREEN STATE, WHEREIN WHEN THE SECOND COMPONENT IS PRESSED, THE LOCKING FEATURES ENGAGE TO FORM A SEAL BETWEEN THE FIRST COMPONENT AND THE SECOND COMPONENT

FIG. -16-

FLOW PATH ASSEMBLIES FOR GAS TURBINE ENGINES AND ASSEMBLY METHODS THEREFORE

CROSS REFERENCE TO RELATED APPLICATIONS

This application is a continuation of application Ser. No. 15/690,346, filed Aug. 30, 2017, which is hereby incorporated by reference in its entirety.

FIELD

The present subject matter relates generally to gas turbine engines. More particularly, the present subject matter relates to flow path assemblies for gas turbine engines and methods for assembling such flow path assemblies.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Typically, the combustion section includes a combustor having a combustion chamber defined by a combustor liner. Downstream of the combustor, the turbine section includes one or more stages, for example, each stage may contain a plurality of stationary nozzle airfoils as well as a plurality of blade airfoils attached to a rotor that is driven by the flow of combustion gases against the blade airfoils. The turbine section may have other configurations as well. In any event, a flow path is defined by an inner boundary and an outer boundary, which both extend from the combustor through the stages of the turbine section.

Conventionally, the inner and outer boundary structures defining the flow path have been formed of separate components. For example, an outer liner of the combustor, a separate outer band of a nozzle portion of a turbine stage, and a separate shroud of a blade portion of the turbine stage usually define at least a portion of the outer boundary of the flow path. However, utilizing separate components to form each of the outer boundary and inner boundary requires a greater number of parts. By reducing the number of components and corresponding gaps between components, the parasitic leakages are reduced and the engine efficiency is improved. Therefore, flow path assemblies may be utilized that have a unitary construction, e.g., a unitary outer boundary structure, where two or more components of the outer boundary are integrated into a single piece, and/or a unitary inner boundary structure, where two or more components of the inner boundary are integrated into a single piece.

A unitary construction of such flow path components can be furthered by assembling turbine nozzle airfoils, which also may be referred to as stator vanes, with the outer boundary structure and the inner boundary structure. In some instances, the nozzle airfoils can be inserted and secured to one or both of the outer and inner boundary structures. Conventionally, inserting a turbine nozzle airfoil into a boundary structure has been challenging. In particular, conventional methods for securing nozzle airfoils to a boundary structure and sealing the nozzle airfoil with the structure to prevent flow path leakages have been unsatisfactory.

Accordingly, improved methods for assembling flow path assemblies would be desirable. More particularly, improved methods for assembling airfoils with a boundary structure would be beneficial. Additionally, a flow path assembly formed by such methods would be useful.

BRIEF DESCRIPTION

Aspects and advantages of the invention will be set forth in part in the following description, or may be obvious from the description, or may be learned through practice of the invention.

In one exemplary embodiment of the present disclosure, a method for assembling an airfoil with a boundary structure is provided. At least one of the airfoil and the boundary structure being formed from a composite material. The method includes inserting the airfoil defining a cutout into an opening defined by the boundary structure, the boundary structure defining a cutout, wherein when the airfoil is inserted into the opening, a locking ring is received within the cutout defined by the boundary structure and the cutout defined by the airfoil. The method also includes pressing the airfoil against the boundary structure such that the locking ring forms a seal between the airfoil and the boundary structure.

In another exemplary embodiment of the present disclosure, a flow path assembly for a gas turbine engine is provided. The flow path assembly includes a boundary structure formed from a composite material and defining an opening, the boundary structure further defining a cutout proximate the opening. The flow path assembly also includes an airfoil formed from a composite material and sized to fit within the opening of the boundary structure. The flow path assembly further includes a locking feature received within the cutout defined by the boundary structure to interlock the airfoil with the boundary structure and compressed between the boundary structure and the airfoil to form a seal between the boundary structure and the airfoil.

In a further exemplary embodiment of the present disclosure, a method for assembling a first component with a second component is provided. At least one of the first and second components being formed from a composite material, such as e.g., a CMC material. The first component defining an opening and a locking feature proximate the opening and the second component defining a locking feature. The method includes pressing the second component against the first component while at least one of the first component and the second component are in a green state, wherein when the second component is pressed, the locking features engage to form a seal between the first component and the second component.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-sectional view of an exemplary gas turbine engine according to various embodiments of the present subject matter;

FIG. 2 provides a schematic cross-sectional view of a combustion section and a high pressure turbine section of the gas turbine engine of FIG. 1 according to an exemplary embodiment of the present subject matter;

FIG. 3 provides a schematic cross-sectional view of an exemplary boundary structure according to an exemplary embodiment of the present subject matter;

FIG. 4 provides a schematic cross-sectional view of the exemplary boundary structure of FIG. 3 depicting an opening machined therein;

FIG. 5 provides a schematic cross-sectional view of the exemplary boundary structure of FIG. 3 depicting a cutout machined into the boundary structure;

FIG. 6 provides a schematic cross-sectional view of the exemplary boundary structure of FIG. 3 depicting a locking ring inserted into the cutout;

FIG. 7 provides a schematic cross-sectional view of the exemplary boundary structure of FIG. 3 depicting an exemplary airfoil being inserted into the opening;

FIG. 8 provides a schematic cross section-sectional view of the exemplary boundary structure of FIG. 3 depicting the airfoil being pressed against the boundary structure;

FIG. 9 provides a schematic cross-sectional view thereof of the airfoil assembled with the boundary structure to form a flow path assembly;

FIG. 10 provides a schematic cross-sectional view of another exemplary flow path assembly according to an exemplary embodiment of the present subject matter;

FIG. 11 provides a schematic cross-sectional view of yet another exemplary flow path assembly according to an exemplary embodiment of the present subject matter;

FIG. 12 provides a schematic cross-sectional view of yet another exemplary flow path assembly according to an exemplary embodiment of the present subject matter;

FIG. 13 provides a schematic cross-sectional view of yet another exemplary flow path assembly according to an exemplary embodiment of the present subject matter;

FIG. 14 provides a schematic cross-sectional view of yet another exemplary flow path assembly according to an exemplary embodiment of the present subject matter;

FIG. 15 provides a flow diagram of an exemplary method according to an exemplary embodiment of the present subject matter; and FIG. 16 provides a flow diagram of another exemplary method according to an exemplary embodiment of the present subject.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. The term "proximate" means within twenty percent (20%) of the stated position.

Exemplary aspects of the present disclosure are directed to methods for assembling flow path assemblies for gas turbine engines. In one exemplary aspect, a method for assembling an airfoil with a boundary structure to form a flow path assembly is provided. The exemplary method includes machining an opening into the boundary structure. The boundary structure can be an outer liner, a band, or some unitary structure that defines the flow path of a gas turbine engine. The opening is sized to receive an airfoil or other component. The method also includes machining a cutout into the boundary structure proximate the opening. The cutout can be machined into a sidewall that defines the opening, for example. A locking feature is then inserted into the cutout defined by the boundary structure. The locking feature can be integrally formed with the airfoil or can a separate component, such as e.g., a locking ring. When the airfoil is inserted into the opening, the locking feature interlocks the airfoil with the boundary structure. To seal the airfoil with the boundary structure, the airfoil is then pressed against or into the boundary structure. When the airfoil is pressed, the locking feature is compressed such that a barbed seal is formed between the airfoil and the boundary structure. The result is a secure and sealed flow path assembly. In yet another exemplary aspect, a flow path assembly formed by one of the methods described herein is provided.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10, particularly components within hot gas path 78, such as components of combustion section 26, HP turbine 28, and/or LP turbine 30, may comprise a ceramic matrix composite (CMC) material, which is a non-metallic material having high temperature capability. Of course, other components of turbofan engine 10, such as components of HP compressor 24, may comprise a CMC material. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

As stated, components comprising a CMC material may be used within the hot gas path 78, such as within the combustion and/or turbine sections of engine 10. As an example, the combustion section 26 may include a combustor formed from a CMC material and/or one or more stages of one or more stages of the HP turbine 28 may be formed from a CMC material. However, CMC components may be used in other sections as well, such as the compressor and/or fan sections. Of course, in some embodiments, other high temperature materials and/or other composite materials may be used to form one or more components of engine 10. For instance, a polymer matrix composite (PMC) material can be used to form one or more components of a compressor, such as e.g., the compressor rotor blades or stator vanes.

FIG. 2 provides a schematic cross-sectional view of the combustion section 26 and the HP turbine 28 of the turbine section of the turbofan engine 10 of FIG. 1 according to an exemplary embodiment of the present subject matter. The depicted combustion section 26 includes a generally annular combustor 80, and downstream of the combustion section 26, the HP turbine 28 includes a plurality of turbine stages. More particularly, for the depicted embodiment, the HP turbine 28 includes a first turbine stage 82 and a second turbine stage 84. In other embodiments, the HP turbine 28 can include a different number of turbine stages; for example, the HP turbine 28 can include one turbine stage or more than two turbine stages.

The first turbine stage 82 is positioned immediately downstream of the combustion section 26 and the second turbine stage 84 is positioned immediately downstream of the first turbine stage 82. Each turbine stage 82, 84 includes flow path assemblies, including a nozzle assembly and a blade assembly. In particular, the first turbine stage 82 includes a nozzle flow path assembly 82N and a blade flow path assembly 82B. Similarly, the second turbine stage 84 includes a nozzle flow path assembly 84N and a blade flow path assembly 84B. Moreover, combustor 80 defines a generally annular combustion chamber 86 such that the combustor 80 may be described as an annular combustor.

One or more boundary structures define a flow path 100 through the combustion section 26 and the HP turbine 28. For this embodiment, the boundary structures include an outer wall 102 and an inner wall 104. The outer and inner walls 102, 104 define the flow path 100 for the combustion gases 66 through the combustion section 26 and HP turbine 28; thus, the flow path 100 forms at least a portion of the hot gas path 78 described above with reference to FIG. 1. Further, in other embodiments, the flow path 100 can extend through the LP turbine 30 and jet exhaust section 32 (FIG. 1); in still other embodiments, the flow path 100 can also extend or include other like or similar boundary structures that form part of flow path 100 upstream of the combustion section 26, e.g., into HP compressor 24 (FIG. 1). As such, it will be appreciated that the discussion herein of the present subject matter with respect to combustion section 26 and HP turbine 28 is by way of example only and also may apply to different configurations of gas turbine engines and flow paths.

As shown further in FIG. 2, for this embodiment, the outer wall 102 of the combustor 80 includes an outer liner 108 defining the outer boundary of the flow path 100 through the combustor 80. Each nozzle flow path assembly 82N, 84N includes an outer band defining a portion of the outer boundary of the flow path 100 through the nozzle assembly of each turbine stage and each blade flow path assembly 82B, 84B includes a shroud defining a portion of the outer boundary of the flow path 100 through the blade assembly of each turbine stage. More particularly, as shown in FIG. 2, the first turbine stage nozzle flow path assembly 82N includes an outer band 110, first turbine stage blade flow path assembly 82B includes shroud 112, second turbine stage nozzle flow path assembly 84N includes outer band 114, and second turbine stage blade flow path assembly 84B includes shroud 116. The outer liner 108, the outer bands 110, 114, and the shrouds 112, 116 collectively form the outer wall 102 of the combustor 80 and the HP turbine 28.

Further, as illustrated in FIG. 2, the inner wall 104 of the combustor 80 includes an inner liner 122 defining the inner boundary of the flow path 100 through the combustor 80. Each nozzle flow path assembly 82N, 84N includes an inner band defining an inner boundary of the flow path 100 through the nozzle assembly of each turbine stage and each blade flow path assembly 82B, 84B includes one or more blade platforms that define an inner boundary of the flow path 100 through the blade assembly of each turbine stage. More particularly, as shown in FIG. 2, the first turbine stage nozzle flow path assembly 82N includes inner band 124, first turbine stage blade flow path assembly 82B includes blade platforms 132, second turbine stage nozzle flow path assembly 84N includes inner band 136, and second turbine stage blade flow path assembly 84B includes blade platforms 132. The inner liner 122, the inner bands 124, 136, and the blade platforms 132 collectively form the inner wall 104 of the combustor 80 and the HP turbine 28.

Moreover, in the depicted embodiment of FIG. 2, a combustor dome 118 extends radially across a forward end 88 of the combustor 80. The combustor dome 118 can be a part of outer wall 102, can be a part of inner wall 104, can be a part of both outer wall 102 and inner wall 104 (e.g., a portion of the combustor dome 118 may be defined by the outer wall 102 and the remainder may be defined by the inner wall 104), or can be a separate component from outer wall 102 and inner wall 104. A fuel nozzle assembly 90 is positioned proximate the combustor dome 118 for delivering fuel to the combustion chamber 86.

In some exemplary embodiments, portions of the outer wall 102 can be integrated or unified into a single piece. For instance, the outer liner 108, the outer bands 110, 114, and the shrouds 112, 116 that collectively form the outer wall 102 can be integrated or unified as a single unitary piece. Likewise, portions of the inner wall 104 can be integrated or unified into a single piece. For instance, the inner liner 122 can be integrated or unified with the inner band 124 to form a single piece. The term "unitary" as used herein denotes that the associated component, such as the outer wall 102, is made as a single piece during manufacturing, i.e., the final unitary component is a single piece. Thus, a unitary component has a construction in which integrated portions are inseparable and is different from a component comprising a plurality of separate component pieces that have been joined together and, once joined, are referred to as a single component even though the component pieces remain distinct and the single component is not inseparable (i.e., the pieces may be re-separated). The final unitary component may comprise a substantially continuous piece of material, or in other embodiments, may comprise a plurality of portions that are permanently bonded to one another. In any event, the various portions forming a unitary component are integrated with one another such that the unitary component is a single piece with inseparable portions.

Additionally, nozzle airfoils are positioned in each of the nozzle flow path assemblies 82N, 84N. Each nozzle airfoil 126 within the first turbine stage nozzle flow path assembly 82N extends radially from the outer band 110 to the inner band 124 and the nozzle airfoils 126 are spaced circumferentially about the longitudinal centerline 12. Each nozzle airfoil 128 within the second turbine stage nozzle flow path assembly 84N extends radially from the outer band 114 to the inner band 136 and the nozzle airfoils 128 are spaced circumferentially about the longitudinal centerline 12.

Further, blade airfoils 130 are positioned in each of the blade flow path assemblies 82B, 84B. Each blade airfoil 130 within the first turbine stage blade flow path assembly 82B is attached to blade platform 132, which in turn is attached to a first stage rotor 134. The blade airfoils 130 attached to the first stage rotor 134 are spaced circumferentially about the longitudinal centerline 12. Similarly, each blade airfoil 130 within the second turbine stage blade flow path assembly 84B is attached to a blade platform 132, which in turn is attached to a second stage rotor 138. The blade airfoils 130 attached to the second stage rotor 138 are spaced circumferentially about the longitudinal centerline 12. Each of the blade airfoils 130 extends radially outward toward the outer wall 102, i.e., the outer boundary of the flow path 100, and a clearance gap is defined between a tip 140 of each blade airfoil 130 and the outer wall 102 such that each turbine rotor 134, 138 is free to rotate about the longitudinal centerline 12. Although not depicted, each turbine rotor 134, 138 of the HP turbine 28 is connected to the HP shaft 34 (FIG. 1). In such manner, rotor blade airfoils 130 may extract kinetic energy from the flow of combustion gases 66 through the flow path 100 defined by the HP turbine 28 as rotational energy applied to the HP shaft 34.

In some exemplary embodiments, the airfoils can be assembled with one of the boundary structures, such as e.g., any of the liners, bands noted above, to form one of the nozzle flow path assemblies 82N, 84N and the rotor blades can be assembled with one of the boundary structures, such as e.g., any of the shrouds, platforms noted above, to form one of the blade flow path assemblies 82B, 84B in a manner as described below.

FIGS. 3 through 9 provide an exemplary method for assembling a flow path assembly, such as e.g., one of the nozzle flow path assemblies 82N, 84N of FIG. 2. In particular, FIGS. 3 through 9 provide a method for assembling an airfoil with a boundary structure (e.g. a band) to form a flow path assembly. FIG. 3 provides a schematic cross-sectional view of an exemplary flow path boundary structure 210. FIG. 4 provides another view thereof depicting an opening 222 defined by the boundary structure 210. FIG. 5 provides another view thereof depicting a locking feature 238 defined by the boundary structure 210, and more particularly, FIG. 5 provides a cutout 232 machined into the boundary structure 210. FIG. 6 provides another view thereof depicting a locking ring 242 inserted into the cutout 232. FIG. 7 provides yet another view thereof depicting an airfoil 260 being inserted into the opening 222 and clipping onto the locking ring 242. FIG. 8 provides yet another view thereof depicting the airfoil 260 being pressed against the boundary structure 210. FIG. 9 provides another view thereof depicting the airfoil 260 integrated with the boundary structure 210 to form flow path assembly 200.

As shown in FIG. 3, the boundary structure 210 extends between an outer surface 212 and an inner surface 214 along the radial direction R. The distance between the outer surface 212 and the inner surface 214 defines a thickness of the boundary structure 210. The boundary structure 210 also extends along the circumferential direction C, and for this embodiment, the boundary structure 210 extends along the circumferential direction C three hundred sixty degrees (360°) in a ring shape; thus in FIG. 3, only a part of the boundary structure 210 is shown. Moreover, the boundary structure 210 also extends along the axial direction A, which is a direction into and out of the page in FIG. 3.

For this embodiment, the boundary structure 210 is formed from a composite material, and in particular, the boundary structure 210 is formed from a CMC material. As further shown in FIG. 3, one or more plies 216 can be laid up to form the CMC boundary structure 210. In particular, for this embodiment, the plies 216 are laid up such that the boundary structure 210 defines a first portion 218 and a second portion 220. The first portion 218 has a first thickness T1 that is greater than a second thickness T2 of the second portion 220. In yet other embodiments, the boundary structure 210 can have a constant thickness. After the boundary structure 210 is laid up, the boundary structure 210 can undergo an autoclave compaction process such that the boundary structure 210 is formed to a green state.

As shown in FIG. 4, after the boundary structure 210 is laid up and compacted, the opening 222 is machined into the boundary structure 210. For this embodiment, the opening 222 is machined into the first portion 218 of the boundary structure 210. As the first portion 218 has a greater first thickness T1 than the second thickness T2 of the second portion 220 of the boundary structure 210 (FIG. 3), the machined opening 222 has a greater depth than it would otherwise have if the opening 222 was machined into the second portion 220, which among other things, provides a greater surface area to which the airfoil 260 can be secured (i.e., when the airfoil 260 is inserted into the opening 222 as described more fully below). In alternative exemplary embodiments, the boundary structure 210 can be laid up by one or more plies in such a way so that opening 222 is already preformed or defined without need to machine the opening.

As further shown in FIG. 4, the opening 222 defined by the boundary structure 210 extends between an outer end 224 and an inner end 226 along the radial direction R, and between one or more sidewalls 228 of the boundary structure 210 that define opening 222 along the axial and circumferential directions A, C. The width and depth of the opening 222 are sized to receive the airfoil 260. Moreover, in addition to machining the opening 222, one or more chamfered edges 230 can be machined into a region of the boundary structure 210 formed between the sidewalls 228 and outer surface 212 proximate the outer end 224 of the opening 222 as depicted in FIG. 4. The chamfered edge 230 can extend along the perimeter of the opening 222 proximate the outer end 224. The one or more chamfered edges 230 may assist an operator or machine with inserting objects into the opening (such as e.g., airfoil 260) and may also assist with aligning the airfoil 260 with the opening 222. In some embodiments, the boundary structure 210 and the chamfered edge 230 are machined while the boundary structure 210 is in the green state. In yet other embodiments, the chamfered edge 230 can be laid up by one or more plies in such a way so that chamfered edge 230 is already preformed or defined without need to machine the edges into the boundary structure 210.

As shown in FIG. 5, after the opening 222 and chamfered edge 230 have been machined into the boundary structure 210, cutout 232 is machined into the boundary structure 210 proximate the opening 222 such that the boundary structure 210 defines locking feature 238. For this embodiment, the cutout 232 is machined into the sidewall 228 that defines the opening 222 approximately midway between the outer end 224 and the inner end 226 of the opening 222 along the radial direction R. The cutout 232 is machined into the sidewall 228 of the opening 222 around the entire perimeter of the opening 222. In some embodiments, however, the cutout 232 is not machined about the entire perimeter of the opening 222. For instance, in some embodiments, a plurality of cutouts can be spaced apart from one another about the perimeter. Any suitable material removal tool can be used to machine the cutout 232 or cutouts. In some embodiments, the cutout 232 is machined while the boundary structure 210 is in the green state.

In addition, for this embodiment, the cutout 232 machined into the sidewall 228 has a C-shaped axial cross section as shown in FIG. 5 (the cutout 232 also has a C-shaped circumferential cross section in this embodiment). Notably, the C-shaped axial cross section of the cutout 232 is angled or titled with respect to the axial direction A such that the mouth of the cutout 232 opens more toward the outer end 224 of the opening 222. In this way, the cutout 232 is oriented such that when an object is inserted into the cutout 232 (e.g., locking ring 242 as shown in FIG. 6), the inserted object will be angled or titled radially outward toward the outer end 224 of the opening 222.

In some embodiments, as shown in FIG. 5, the first portion 218 of the boundary structure 210 can have a width W on one or both sides of the opening 222 that is sufficient to allow for future cutouts 232 (shown in dashed lines) to be machined into the boundary structure 210. For instance, as shown in FIG. 5, the width W of the first portion 218 is such that at least two future cutouts 232 can be machined into the boundary structure 210. In this manner, if the boundary structure, airfoil, and/or seal therebetween becomes damaged during service, instead of replacing the entire boundary structure 210, the same boundary structure 210 can be utilized for further use in service after the existing opening 222 is widened and a new cutout is machined into the boundary structure 210. It will be appreciated that the component being inserted into the widened opening must be sized to fit the widened opening.

As shown in FIG. 6, after the cutout 232 is machined into the boundary structure 210 (FIG. 5) to define locking feature 238 of boundary structure 210, a locking feature 240 is inserted into the cutout 232. In particular, for this embodiment, the locking feature 240 is locking ring 242 having an oval-shaped axial cross section (the circumferential cross section of locking ring 242 is likewise an oval shape in this embodiment). In alternative embodiments, the locking ring 242 can have other suitable axial or circumferential cross-sectional shapes. In addition, locking ring 242 can have any suitable radial cross section. For instance, where opening 222 is a circular opening, locking ring 242 can likewise have a circular shape complementary to the circular shape of the opening 222. In alternative embodiments, locking ring 242 can have other suitable radial cross sections, such as e.g., an oval, a racetrack or stadium shape, or some irregular shape.

For this embodiment, when inserted into the cutout 232, the locking ring 242 extends about the perimeter of the opening 222. In some embodiments, the locking ring 242 need not extend along the entire perimeter of the opening 222. For instance, where the cutout 232 does not extend along the perimeter of the opening 222 but rather has a plurality of cutouts spaced apart from one another about the perimeter, the locking ring 242 can have corresponding separate components that can each be fit into respective cutouts. Due to the orientation of the cutout 232 in the sidewalls 228 of the boundary structure 210, the inserted locking ring 242 is tilted or angled radially outward toward the outer end 224 of the opening 222 and projects outward into the opening 222. In particular, the locking ring 242 has a head portion 244 and a base portion 246. When the locking ring 242 is inserted into the cutout 232, the base portion 246 is received and situated within the cutout 232 and head portion 244 projects outward into the opening 222 toward the outer end 224 of the opening 222. By angling or tilting the locking ring 242 toward the outer end 224 of the opening 222, a substantially V-shaped recess 234 is formed between the locking ring 242 and the sidewall 228 of the boundary structure 210. In other embodiments, the recess 234 can be other suitable shapes. For example, in some embodiments, the recess 234 can be a U-shaped recess.

As shown in FIG. 7, after the locking ring 242 is inserted into the cutout 232 defined by the sidewalls 228 of the boundary structure 210 (FIG. 6), the airfoil 260 is inserted into the opening 222. In FIG. 7, the airfoil 260 is shown being inserted radially inward into the opening 222. The airfoil 260 inserted into the opening 222 defines a locking feature 248, which in this embodiment is a cutout 262. For this embodiment, an outer wall 264 of the airfoil 260 defines cutout 262. The cutout 262 extends about the perimeter of the outer wall 264 of the airfoil 260. The cutout 262 can be machined into the outer wall 264 of the airfoil 260 in any suitable fashion by any suitable material removal tool. In alternative embodiments, the cutout 262 can be formed by laying up one or more plies to form the desired cutout shape. When the airfoil 260 is inserted into the opening 222, the head portion 244 of locking ring 242 is received within the cutout 262 defined by the airfoil 260. The airfoil 260 "clips" or "locks" onto the locking ring 242 to interlock the airfoil 260 with the boundary structure 210.

The cutout 262 defined by the airfoil 260 is shaped to receive a portion of the locking ring 242 when the airfoil 260 is inserted into the opening 222. For this embodiment, the cutout 262 is shaped to receive the head portion 244 of the locking ring 242 when the airfoil 260 is inserted into the opening 222 (i.e., the cutout 262 has a C-shaped axial cross section to receive the oval-shaped axial cross section of the locking ring 242 as shown in FIG. 7). Notably, the C-shaped cross section of the cutout 262 defined by the airfoil 260 is angled or tilted toward the inner end 226 of the opening 222 (i.e., radially inward) with respect to the axial direction A. In this way, the cutout 262 is oriented such that when the airfoil 260 is inserted into the opening 222, the cutout 262 is configured to receive an object (e.g., the locking ring 242) that is angled or tilted radially outward toward the outer end 224 of the opening 222.

As further shown in FIG. 7, the airfoil 260 also includes a locking portion 266 positioned radially outward of the cutout 262. The locking portion 266 is shaped complementary to the recess 234 defined between the locking ring 242 and the sidewall 228 of the boundary structure 210. Thus, for this embodiment, the locking portion 266 of the airfoil 260 is substantially V-shaped. As shown in FIG. 7, the locking portion 266 comes to an end point 268 to form the V shape. The outer wall 264 and an interior wall of the cutout 262 form the arms of the V shape. When the airfoil 260 is inserted into the opening 222, the locking portion 266 of the airfoil 260 is inserted into and received within the V-shaped recess 234 to interlock the airfoil 260 with the boundary structure 210. In particular, a barbed interlocked joint is formed where the locking portion 266 is received within the recess 234.

To further secure the airfoil 260 with the boundary structure 210, the airfoil 260 also includes a boss portion 270 positioned radially inward of the cutout 262. The boss portion 270 forms a part of the outer wall 264 of the airfoil 260. The boss portion 270 protrudes further outward than a flow path portion 272 of the airfoil 260. When the airfoil 260 is inserted into the opening 222, the outer wall 264 of the boss portion 270 is pressed against the sidewall 228 in mating engagement. For instance, the outer wall 264 of the boss portion 270 is shown in mating engagement with the sidewall 228 of the boundary structure 210 in FIGS. 8 and 9. The mating engagement of the boss portion 270 with the sidewall 228 further secures and interlocks the airfoil 260 with the boundary structure 210 when the airfoil 260 is inserted into the opening 222.

As further shown in FIG. 7, the airfoil 260 includes a chamfered edge 274 and a mating edge 276. The chamfered edge 274 is complementary to the chamfered edge 230 of the boundary structure 210. The mating edge 276 of the airfoil 260 is complementary to the outer surface 212 of the first portion 218 of the boundary structure 210. When the airfoil 260 is inserted into the opening 222, the chamfered edge 274 of the airfoil 260 is pressed against the chamfered edge 230 of the boundary structure 210 in mating engagement, and likewise, the mating edge 276 of the airfoil 260 is pressed against the outer surface 212 of the boundary structure 210 in mating engagement. For instance, the chamfered edge 274 of the airfoil 260 is shown in mating engagement with the chamfered edge 230 of the boundary structure 210 and the mating edge 276 of the airfoil 260 is shown in mating engagement with the outer surface 212 of the boundary structure 210 in FIGS. 8 and 9. These mating surfaces further secure the airfoil 260 with the boundary structure 210.

As shown in FIG. 8, after the airfoil 260 is inserted into the opening 222 and interlocked with the boundary structure 210 via the locking ring 242 (FIG. 7), the airfoil 260 is pressed against the boundary structure 210. In particular, in FIG. 8, the airfoil 260 is shown being pressed radially inward. When the airfoil 260 is pressed, the airfoil 260 compresses the locking ring 242 against the boundary structure 210 within a cavity defined by the cutout 232 defined by the boundary structure 210 (FIG. 5) and the cutout 262 defined by the airfoil 260 (FIG. 7). In particular, the interior wall of the cutout 262 defined by the airfoil 260 presses against the head portion 244 of the locking ring 242 so as to compress the locking ring 242 against the boundary structure 210. In this way, a barbed seal 280 is formed between the airfoil 260 and the boundary structure 210 (FIG. 9).

For the depicted embodiment of FIG. 8, the airfoil 260 can be pressed in the following exemplary manner. As shown, a hard tool 290 is positioned about the opening 222 along the inner surface 214 of the boundary structure 210. The hard tool 290 controls the airfoil shape of the airfoil 260 and supports the boundary structure 210 when the airfoil 260 is pressed. A pressing tool 292 is operatively configured to apply a pressing force to the airfoil 260 to press the airfoil 260 against the boundary structure 210. For instance, the pressing tool 292 can pneumatically press the airfoil 260 with pressurized air against the boundary structure 210 and hard tool 290 as shown in FIG. 8. The hard tool 290 ensures proper alignment of the airfoil 260 relative to the boundary structure 210 during pressing and counteracts the pressing force to facilitate mating engagement of the various complementary surfaces of the airfoil 260 and the boundary structure 210. In alternative embodiments, other suitable methods for pressing the airfoil 260 can be used.

In addition to the airfoil 260 compressing the locking ring 242 against the boundary structure 210 within a cavity defined by the joined cutouts 232, 262 when the airfoil 260 is pressed, the various mating surfaces of the airfoil 260 are pressed into flush mating engagement with their corresponding boundary structure mating surfaces. In particular, the mating edge 276 is pressed into flush mating engagement with the outer surface 212 of the boundary structure 210, the chamfered edge 274 of the airfoil 260 is pressed into flush mating engagement with the chamfered edge 230 of the boundary structure 210, one of the edges of the locking portion 266 of the airfoil 260 is pressed into flush mating engagement with the sidewall 228, the edges of the boss portion 270 are pressed into flush waiting engagement with the sidewall 228, and an inner surface 278 of the boss portion 270 presses against the hard tool 290.

As shown in FIG. 9, the airfoil 260 is assembled with the boundary structure 210 to form flow path assembly 200. In particular, the locking ring 242 is shown compressed in a deformed state. More particularly still, the locking ring 242 is deformed from its original oval-shape cross section (FIG. 6) (i.e., the cross section of the locking ring 242 prior to the airfoil 260 being pressed) to the now compressed deformed oval-shaped cross section. By compressing the locking ring 242, a barbed seal 280 is formed. The barbed seal 280 seals the airfoil 260 with the boundary structure 210 such that flow leakage is reduced or eliminated.

After the airfoil 260 is pressed, the resulting flow path assembly 200 can be subjected to one or more finishing processes. For instance, the flow path assembly 200 can be subjected to a burn out process and a melt infiltration process. In alternative exemplary embodiments, the full path assembly 200 can undergo a chemical vapor infiltration process to finish the flow path assembly 200.

FIG. 10 provides another exemplary embodiment of flow path assembly 200 according to an exemplary embodiment of the present subject matter. The flow path assembly 200 depicted in FIG. 10 can be assembled in the same or similar manner as the flow path assembly illustrated in FIGS. 3 through 9 and described in the accompanying text except as noted below. For this embodiment, the cutout 232 defined in the sidewall 228 of the boundary structure 210 has a C-shaped cross section that is not angled or tilted with respect to the axial direction A and the body of the airfoil 260 does not include a boss portion. As shown, when the locking ring 242 is inserted into the cutout 232, the locking ring 242 is not angled or tilted with respect to the axial direction A. More particularly, the head portion 244 of the locking ring 242 is not tilted or angled toward either the outer end 224 or the inner end 226 of the opening 222 when the locking ring 242 is inserted into the cutout 232. As such, when the airfoil 260 is inserted into the opening 222, the outer wall 264 or walls of the airfoil 260 are pressed inward toward a radial centerline RC of the opening 222. When the cutout 262 defined by the airfoil 260 is aligned with the locking ring 242, the airfoil 260 is released and allowed to expand outward away from the radial centerline RC such that the cutout 262 receives the locking ring 242. This allows the airfoil 260 to snap or clip into place. The locking ring 242 can be compressed to seal the airfoil 260 with the boundary structure 210 in the same or similar manner described above.

FIG. 11 provides another exemplary embodiment of flow path assembly 200 according to an exemplary embodiment of the present subject matter. The flow path assembly 200 depicted in FIG. 11 can be assembled in the same or similar manner as the flow path assembly illustrated in FIGS. 3 through 10 and described in the accompanying text except as noted below. For this embodiment, the locking feature 238 defined by the boundary structure 210 is cutout 232. The cutout 232 is defined in the sidewall 228 of the boundary structure 210 and has a partial-oval shaped axial cross section that is not angled or tilted with respect to the axial direction A. The locking feature 248 of the nozzle 260 is cutout 262. Furthermore, flow path assembly 200 also includes locking feature 240, which in this embodiment is locking ring 242.

As shown particularly in FIG. 11, for this embodiment, the cutout 232 is defined by the sidewall 228 proximate the inner end 226 of the opening 222. By positioning or defining the cutout 232 at or proximate the inner end 226 of the opening 222, flow path combustion gases are sealed off at the outer boundary of the flow path, and thus, hot combustion gases are prevented from leaking radially between the airfoil 260 and the boundary structure 210. As noted previously, proximate means within 20% of the stated position. For this example, proximate the inner end 226 is determined by calculating twenty percent (20%) of the depth of the opening 222, and if the cutout is within the calculated distance from the inner end 226, the cutout can be said to be proximate the inner end 226 of the opening 222.

In alternative embodiments, the cutout 232 can be defined by the sidewall 228 proximate the outer end 224 of the opening 222. This may, for example, make insertion of the locking ring 242 easier during the assembly process. In yet further embodiments, wherein the opening is defined by one or more sidewalls of the boundary structure, a midpoint is defined between the outer end and the inner end of the opening 222. In such embodiments, the locking feature 238 of the boundary structure 210 (which can be cutout 232, for example) is defined by sidewall 228 proximate the midpoint.

FIG. 12 provides another exemplary embodiment of flow path assembly 200 according to an exemplary embodiment of the present subject matter. The flow path assembly 200 depicted in FIG. 12 can be assembled in the same or similar manner as the flow path assembly illustrated in FIGS. 3 through 9 and described in the accompanying text as noted below. For this embodiment, the locking feature 248 of the airfoil 260 is a locking projection 250 and the locking feature 238 of the boundary structure 210 is cutout 232 configured to receive the locking projection 250 of the airfoil 260.

More particularly, for this embodiment, the locking feature 248 is a locking projection 250 integrally formed with outer wall 264 of the airfoil 260. As depicted, the locking projection 250 has a C-shaped cross section that is shaped complementary to the C-shaped cross section of the cutout 232 defined by the boundary structure 210. Notably, the locking projection 250 is tilted or angled with respect to the axial direction A such that the C-shaped cross section is angled toward the inner end 226 of the opening 222. In this way, when the airfoil 260 is inserted into the opening 222, the locking projection 250 extends toward the inner end 226 of the opening 222 and projects into the cutout 232 defined by the boundary structure 210 so as to interlock the airfoil 260 with the boundary structure 210. Moreover, for this embodiment, the locking projection 250 is formed of a material capable of being compressed when the airfoil 260 is pressed against the boundary structure 210. In this way, when the airfoil 260 is pressed, the locking projection 250 is compressed within the cutout 232 such that barbed seal 280 can be formed between the airfoil 260 and the boundary structure 210.

FIG. 13 provides another exemplary embodiment of flow path assembly 200 according to an exemplary embodiment of the present subject matter. The flow path assembly 200 depicted in FIG. 13 can be assembled in the same or similar manner as the flow path assembly illustrated in FIGS. 3 through 9 and described in the accompanying text except as noted below. For this embodiment, the locking feature 238 of the boundary structure 210 is a locking projection 256 and the locking feature 248 of the airfoil 260 is a cutout 262 configured to receive the locking projection 256 of the boundary structure 210.

More particularly, for this embodiment, the locking projection 256 is integrally formed with the boundary structure 210. As depicted, the locking projection 256 has an axial C-shaped cross section that is shaped complementary to the axial C-shaped cross section of the cutout 262 defined by the airfoil 260. Notably, the locking projection 256 is tilted or angled with respect to the axial direction A such that the axial C-shaped cross section is angled toward the outer end 224 of the opening 222. In this way, when the airfoil 260 is inserted into the opening 222, the locking projection 256 extends toward the outer end 224 of the opening 222 and projects into the cutout 262 defined by the airfoil 260 so as to interlock the airfoil 260 with the boundary structure 210. Moreover, for this embodiment, the locking projection 256 is formed of a material capable of being compressed when the airfoil 260 is pressed against the boundary structure 210. In this way, when the airfoil 260 is pressed, the locking projection 250 is compressed within the cutout 262 such that seal 280 can be formed between the airfoil 260 and the boundary structure 210.

FIG. 14 provides another exemplary embodiment of flow path assembly 200 according to an exemplary embodiment of the present subject matter. The flow path assembly 200 depicted in FIG. 14 can be assembled in the same or similar manner as the flow path assembly illustrated in FIGS. 3 through 9 and described in the accompanying text except as noted below. In particular, for this embodiment, the locking feature 248 of the airfoil 260 is a projection 252 integrally formed with the outer wall 264 of the airfoil 260. The locking feature 238 of the boundary structure 210 is an inner chamfered edge 236. The projection 252 has a triangular-shaped axial cross section having an inclined surface 254 that is shaped complementary to the inner chamfered edge 236 of the boundary structure 210. For this embodiment, when the airfoil 260 is inserted into the opening 222, the inclined surface 254 becomes in mating engagement with the inner chamfered surface 236 of the boundary structure 210. The mating engagement of the inclined surface 254 and the inner chamfered surface 236 creates a wedge-like interlock and seal to secure the airfoil 260 with the boundary structure 210.

As previously stated, one or more components of the flow path assembly 200 can be formed from a CMC material. Examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 10° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well. Thus, a variety of processes may be used to form one or more components of flow path assembly 200 as a CMC component or components.

FIG. 15 provides a flow diagram of an exemplary method (300) according to an exemplary embodiment of the present subject matter. In particular, FIG. 15 provides a flow diagram for a method for assembling an airfoil with a boundary structure, at least one of the airfoil and the boundary structure being formed from a composite material. For instance, the composite material can be a CMC material, a PMC material, or some other composite material.

At (302), the method (300) includes inserting the airfoil defining a cutout into an opening defined by the boundary structure, the boundary structure defining a cutout, wherein when the airfoil is inserted into the opening, a locking ring is received within the cutout defined by the boundary structure and the cutout defined by the airfoil. For instance, the boundary structure can be boundary structure 210 as shown and described herein. In particular, boundary structure 210 can be any portion of the outer wall 102, including e.g., the outer liner 108, the outer bands 110, 114, the shrouds 112, 116, a unitary piece made up one or more of these boundary structures, etc. Boundary structure 210 can also be any portion of the inner wall 104, including e.g., the inner liner 122, the inner bands 124, 136, the blade platforms 132, a unitary piece made up of one or more of these boundary structures, etc. The opening can be the opening 222 as shown in FIG. 4 and described in the accompanying text.

Moreover, the cutout defined by the boundary structure can be the cutout 232 machined into one of the sidewalls 228 of the boundary structure 210. The cutout can have, for example, a C-shaped cross section about the perimeter of the opening. In some instances, the C-shaped cross section can be angled or tilted with respect to the axial direction A such that the C-shaped cross section is angled radially inward toward the inner end of the opening or angled radially outward toward the outer end of the opening. In other implementations, the cutout machined into the boundary structure can have other suitable cross-sectional shapes.

The locking ring can be locking ring 242, for instance. In some implementations, the opening defined by the boundary structure extends between an outer end and an inner end, and wherein when the locking ring is inserted into the cutout defined by the boundary structure, the locking ring extends toward the outer end of the opening and projects outwardly into the opening so as to form a substantially V-shaped recess between the locking ring and the boundary structure. In some implementations, the locking ring has an oval-shaped cross section and can extend along the perimeter of the cutout defined by the boundary structure. In other implementations, the locking ring can have other suitable cross-sectional shapes.

In addition, the airfoil can be airfoil 260 illustrated and described herein. Airfoil 260 can be part of one of the nozzle flow path assemblies 82N, 84N, for example. In some implementations, when the airfoil is inserted into the opening, a locking portion of the airfoil is inserted into the V-shaped recess to interlock the airfoil with the boundary structure. Further, in some implementations, the cutout machined into the airfoil has a C-shaped cross section.

In some implementations, prior to inserting the airfoil into the opening, the method (300) further includes machining the opening into the boundary structure. The method (300) also includes machining the cutout into the boundary structure proximate the opening. In addition, the method (300) also includes inserting the locking ring into the cutout. The locking ring can also be a composite material, such as e.g., a CMC material. The locking ring can be inserted into the opening while in a green state or in a wet state (i.e., before being subjected to an autoclave process). The locking ring can be fabricated as a noodle.

In some implementations, the airfoil is formed of composite material. In such implementations, when the airfoil is inserted into the opening and pressed against the boundary structure, the airfoil is in the green state. Further, in some implementations, the boundary structure is formed of composite material. In such implementations, when the airfoil is inserted into the opening and pressed against the boundary structure, the boundary structure is in the green state. In yet further implementations, the airfoil and the boundary structure are formed of composite material. In such implementations, when the airfoil is inserted into the opening and pressed against the boundary structure, the airfoil and the boundary structure are both in the green state. When one or both of the components are composite materials and in a green state when the airfoil is inserted into the opening, the pliability of the components allow for the airfoil to be more easily inserted into and locked into place.

In some implementations, the method (300) further includes laying up one or more plies to form the boundary structure. In such an implementation, one or more plies are laid up such that the boundary structure defines a first portion and a second portion, the first portion having a first thickness and the second portion having a second thickness, the first thickness of the first portion greater than the second thickness of the second portion. In such implementations, during machining the opening into the boundary structure, the opening is machined into the first portion of the boundary structure. This can, among other things, provide for an opening with a greater depth, which in turn provides for a greater amount of surface area to which a airfoil or other structure may attach.

In some implementations, prior to inserting the airfoil into the opening, the method further includes forming the opening in the boundary structure by laying up one or more plies in such a way that the opening is formed in the boundary structure. The method also includes forming the cutout defined by the boundary structure by laying up one or more plies in such a way that the cutout is defined by the boundary structure. In this way, instead of machining these various features, the boundary structure can be laid up to define these features.

In some implementations, after laying up the one or more plies to form the boundary structure, the method (300) further includes compacting the boundary structure. This can be done, for example, by inserting the boundary structure into an autoclave or similar structure.

At (304), the method (300) includes pressing the airfoil against the boundary structure such that the locking ring forms a seal between the airfoil and the boundary structure. For instance, the barbed seal can be the barbed seal 280. The locking ring can be locking ring 242. The cutout defined by the boundary structure can be the cutout 232 and the cutout defined by the airfoil can be the cutout 262. When the locking ring 242 is compressed, the locking ring 242 can be deformed from its original shape and compressed against the walls of a cavity defined by the joined cutouts 232, 262. For example, in some implementations, prior to pressing, the locking ring 232 can have an oval-shaped cross section. After pressing, the locking ring 232 can have a deformed oval-shaped cross section as shown in FIG. 9, for example.

In some further implementations, the method (300) includes positioning a hard tool about the opening along the inner surface of the boundary structure. For example, the hard tool can be the hard tool 290 as shown in FIG. 8 and described in the accompanying text. In such implementations, during pressing, the airfoil is pneumatically pressed against the boundary structure and the boundary structure in turn presses against the hard tool such that the locking ring is compressed between the cutout defined by the boundary structure and the cutout defined by the airfoil.

In yet other implementations, after pressing the airfoil, the method (300) further includes bonding the airfoil, the locking ring, and the boundary structure to one another via at least one of a burnout process, a melt infiltration process, and a chemical vapor infiltration process.

FIG. 16 provides a flow diagram of an exemplary method (400) according to an exemplary embodiment of the present subject matter. In particular, FIG. 16 provides a flow diagram for a method for assembling a first component with a second component. At least one of the first and second components are formed from a composite material. The first component defines an opening and a locking feature proximate the opening and the second component defines a locking feature. The composite material can be, for example, a CMC material, a PMC material, or some other composite material. One of the components can be a nickel-based alloy, for example. Moreover, in some implementations, the first component can be boundary structure 210 and the second component can be airfoil 260.

At (402), the method (400) includes pressing the second component against the first component while at least one of the first component and the second component are in a green state, wherein when the second component is pressed, the locking features engage to form a seal between the first component and the second component.

In some implementations, the method (400) includes machining an opening into the first component. The opening can be the opening 222 as shown in FIG. 4 and described in the accompanying text. The first component, as noted above, can be boundary structure 210 as shown in FIGS. 3 through 12 and described in the accompanying text. The opening can be machined into the first component while the first component is in a green state.

In some implementations, the method (400) includes machining a cutout into the first component proximate the opening. For instance, the cutout can be the cutout 232 machined into one of the sidewalls 228 of the boundary structure 210. The cutout can have, for example, a C-shaped cross section about the perimeter of the opening. In some instances, the C-shaped cross section can be angled or tilted with respect to the axial direction A such that the C-shaped cross section is angled radially inward toward the inner end of the opening or angled radially outward toward the outer end of the opening. In other implementations, the cutout machined into the first component can have other suitable cross-sectional shapes. The cutout can be machined into the first component proximate the opening while the first component is in a green state.

In some implementations, the method (400) includes pressing a second component against the first component, wherein when the second component is pressed, a locking feature is received within the cutout defined by the first component and is compressed within the cutout to form a barbed seal between the first component and the second component. In some implementations, the locking feature is a locking ring. For example, the locking feature can be locking ring 242. In yet other implementations, the locking feature is integrally formed with the second component. For example, the locking feature can be locking projection 250. In yet further implementations, the locking feature is integrally formed with the second component as a projection 252 having an inclined surface 254 having an angle of inclination complementary to inner chamfered edge 236 of the boundary structure 210. During pressing the second component, the first and second component can both be in a green state. By pressing the second component against the first component while both components are in the green state, the components are both pliable such that they can more easily be assembled to the desired orientation and second component can more easily be pressed and positioned in place with the first component. Moreover, as the components are both pliable in the green state, there is less damage to the components as the second component is pressed against the first component. In the green state, the components are not as brittle as the fully cured and finished composite state, and thus, there is less cracking or damage to the microstructure of the first and second components.

In some implementations, the first component defines an inner surface and an outer surface. In such implementations, the method (400) further includes positioning a hard tool about the opening along the inner surface of the first component. And during pressing, the second component is pneumatically pressed against the first component such that the locking feature is compressed into the cutout defined by the first component.

In yet other implementations, after pressing the second component, the method (400) further includes bonding the first component, the second component, and the locking feature (if a separate component) to one another via at least one of a burnout process, a melt infiltration process, and a chemical vapor infiltration process to cure the composite components.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for assembling an airfoil with a boundary structure, at least one of the airfoil and the boundary structure being formed from a composite material, the method comprising:
   inserting the airfoil defining a first cutout into an opening defined by the boundary structure, the boundary structure defining a second cutout;
   inserting a locking ring into the second cutout defined by the boundary structure or the first cutout defined by the airfoil prior to the airfoil being inserted into the opening defined by the boundary structure; and then
   pressing the airfoil against the boundary structure such that the locking ring engages with the airfoil and the boundary structure,
   wherein the airfoil is formed of the composite material, and
   wherein when the airfoil is inserted into the opening and pressed against the boundary structure, the airfoil is in a green state.

2. The method of claim 1, wherein prior to inserting the airfoil into the opening, the method further comprises:
   machining the opening into the boundary structure;
   machining the first cutout into the airfoil; and
   machining the second cutout into the boundary structure.

3. The method of claim 1, wherein prior to inserting the airfoil into the opening, the method further comprises:
   forming the opening in the boundary structure by laying up one or more plies in such a way that the opening is formed in the boundary structure; and
   forming the second cutout defined by the boundary structure by laying up one or more plies in such a way that the second cutout is defined by the boundary structure.

4. The method of claim 1, wherein the method further comprises:
   laying up one or more plies to form the boundary structure, wherein the one or more plies are laid up such that the boundary structure defines a first portion and a second portion, the first portion having a first thickness (T1) and the second portion having a second thickness (T2), the first thickness (T1) of the first portion greater than the second thickness (T2) of the second portion, wherein during machining the opening into the boundary structure, the opening is machined into the first portion of the boundary structure.

5. The method of claim 1, wherein the opening defined by the boundary structure extends between an outer end and an inner end, and wherein when the locking ring is inserted into the second cutout defined by the boundary structure, the locking ring extends toward the outer end of the opening and projects outwardly into the opening so as to form a recess between the locking ring and the boundary structure, and wherein when the airfoil is inserted into the opening, a locking portion of the airfoil is inserted into the recess to interlock the airfoil with the boundary structure.

6. The method of claim 1, wherein the second cutout machined into the boundary structure has a C-shaped cross section, and wherein the first cutout defined by the airfoil has a C-shaped cross section, and wherein the locking ring has an oval-shaped cross section.

7. The method of claim 1, wherein the boundary structure defines an inner surface and an outer surface, and wherein the method further comprises:
   positioning a tool about the opening along the inner surface of the boundary structure;
   wherein, during pressing, the airfoil is pressed against the boundary structure and the boundary structure in turn presses against the tool such that the locking ring engages with the second cutout defined by the boundary structure and the first cutout defined by the airfoil.

8. The method of claim 1, wherein after pressing the airfoil, the method further comprises:
   bonding the airfoil, the locking ring, and the boundary structure to one another via a burnout process, a melt infiltration process, or a chemical vapor infiltration process.

9. A flow path assembly for a gas turbine engine, the flow path assembly comprising:
   a boundary structure formed from a composite material and defining an opening, the boundary structure further defining a cutout proximate the opening;
   an airfoil formed from a composite material and sized to fit within the opening of the boundary structure; and
   a locking feature received within the cutout defined by the boundary structure to interlock the airfoil with the boundary structure and engage with the boundary structure and the airfoil,
   wherein the locking feature is a locking ring having an oval-shaped axial cross section, the oval-shaped axial cross section defining a major axis that is defined by the longest diameter of the oval-shaped axial cross section, and
   wherein the opening defined by the boundary structure extends between an outer end and an inner end, and wherein the major axis of the locking ring extends toward the outer end of the opening and projects into the opening so as to define a recess between the locking ring and the boundary structure, and wherein the airfoil comprises a locking portion that fills the recess to interlock the airfoil with the boundary structure.

10. A flow path assembly for a gas turbine engine, the flow path assembly comprising:
- a boundary structure formed from a composite material and defining an opening, the boundary structure further defining a cutout proximate the opening;
- an airfoil formed from a composite material and sized to fit within the opening of the boundary structure; and
- a C-shaped locking feature received within the cutout defined by the boundary structure to interlock the airfoil with the boundary structure and engage with the boundary structure and the airfoil, wherein the C-shaped locking feature is integrally formed with the airfoil such that the C-shaped locking feature and the airfoil are formed as a monolithic component, wherein the opening defined by the boundary structure extends between an outer end and an inner end, and wherein when the airfoil is inserted into the opening, wherein a midline of the C-shaped locking feature formed integrally with the airfoil extends toward the inner end of the opening and projects into the cutout defined by the boundary structure so as to interlock the airfoil with the boundary structure.

11. The flow path assembly of claim 9 or 10, wherein the opening is defined by one or more sidewalls of the boundary structure, wherein the opening defined by the boundary structure extends between an outer end and an inner end, wherein a midpoint is defined between the outer end and the inner end, and wherein the cutout is defined by the one or more sidewalls proximate the midpoint.

12. The flow path assembly of claim 9 or 10, wherein the opening is defined by one or more sidewalls of the boundary structure, and wherein the opening defined by the boundary structure extends between an outer end and an inner end, and wherein the cutout is defined by the one or more sidewalls proximate at least one of the outer end and the inner end.

* * * * *